United States Patent
Wu

(10) Patent No.: US 10,310,370 B2
(45) Date of Patent: Jun. 4, 2019

(54) IMAGE CAPTURING DEVICE WITH HIGH IMAGE SENSING COVERAGE RATE AND RELATED IMAGE CAPTURING METHOD

(71) Applicant: VIVOTEK INC., New Taipei (TW)

(72) Inventor: Jen-Chih Wu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/853,924

(22) Filed: Dec. 25, 2017

(65) Prior Publication Data

US 2018/0188644 A1   Jul. 5, 2018

(30) Foreign Application Priority Data

Dec. 29, 2016   (TW) .............................. 105143793 A

(51) Int. Cl.
    *G03B 37/04*    (2006.01)
    *H04N 5/232*    (2006.01)
    *G02B 13/06*    (2006.01)
    *G02B 13/18*    (2006.01)
    *H04N 5/225*    (2006.01)

(52) U.S. Cl.
    CPC ............ *G03B 37/04* (2013.01); *G02B 13/06* (2013.01); *G02B 13/18* (2013.01); *H04N 5/2254* (2013.01); *H04N 5/2258* (2013.01); *H04N 5/23238* (2013.01)

(58) Field of Classification Search
    None
    See application file for complete search history.

(56) References Cited

U.S. PATENT DOCUMENTS

| 7,123,292 | B1 | 10/2006 | Seeger | |
| 2007/0014551 | A1* | 1/2007 | Fujisawa | G03B 37/02 396/20 |
| 2014/0210707 | A1* | 7/2014 | Holz | G06F 3/017 345/156 |
| 2016/0044284 | A1* | 2/2016 | Goseberg | H04N 5/23238 348/148 |

FOREIGN PATENT DOCUMENTS

| CN | 202502335 U | 10/2012 |
| TW | 201633770 A | 9/2016 |

\* cited by examiner

*Primary Examiner* — Eileen M Adams
(74) *Attorney, Agent, or Firm* — Winston Hsu

(57) ABSTRACT

An image capturing device with high image sensing coverage rate is applied by a related image capturing method. The image capturing device includes a base, an image sensing unit and an optical lens component. The image sensing unit is disposed on a lateral surface of the base, and has a sensing region. The optical lens component is overlapped with the image sensing unit, and has an imagery circle. A central optical axle of the imagery circle does not align with a central point of the sensing region; wherein the image capturing device captures an image via the optical lens component and the imaging sensing unit.

15 Claims, 3 Drawing Sheets

IMAGE CAPTURING DEVICE WITH HIGH IMAGE SENSING COVERAGE RATE AND RELATED IMAGE CAPTURING METHOD

BACKGROUND OF THE INVENTION

1. Field of the Invention

The present invention relates to an image capturing device and a related image capturing method, and more particularly, to an image capturing device and a related image capturing method with high image sensing coverage rate.

2. Description of the Prior Art

The panoramic camera device has wide-angle monitoring function with blind corner and is extensively used as main equipment in the current image monitoring system. One of the panoramic camera devices has a plurality of photograph lenses arranged as a circle, the photograph lenses respectively capture its own images, and the said images are stitched to acquire a panoramic image for the panoramic monitoring function. The other kind of the panoramic camera device utilizes two opposite fisheye lenses to capture fisheye images, and the fisheye images are stitched to acquire the panoramic image containing 360 degrees view region. The image monitoring system is generally disposed on the ceiling, the wall or the ground, and image information about the ceiling, the wall and the ground are unconcerned or useless in actual application of the image monitoring operation, or is in no need of monitoring.

Due to the assembling constraint and property effect of the fisheye lens, the conventional panoramic camera device cannot capture sufficient image information about the major monitoring region within mostly actual applied environment, certain image information (such as the image covering the ceiling, the wall or the ground) which is unmindful by the user is wasted, and the image sensor does not provide optimal ability. Therefore, design of adjusting relation between the camera lens and the image sensor of the image monitoring system to increase an image sensing coverage rate and to maximize a usage region of the image sensor for gaining the needed image information within restricted hardware resource is an important issue in the related monitoring industry.

SUMMARY OF THE INVENTION

The present invention provides an image capturing device and a related image capturing method with high image sensing coverage rate for solving above drawbacks.

According to the claimed invention, an image capturing device with high image sensing coverage rate includes abase, an image sensing unit and an optical lens component. The image sensing unit is disposed on a lateral surface of the base and has a sensing region. The optical lens component is overlapped with the image sensing unit and has an imagery circle, a central optical axle of the imagery circle does not align with a central point of the sensing region. The image capturing device captures an image via the optical lens component and the imaging sensing unit. A field of view formed by the sensing region and the imagery circle overlapped with each other is greater than or equal to 180 degrees. The image capturing device further includes another image sensing unit and another optical lens component disposed on another lateral surface of the base in an overlapped manner. The image capturing device further utilizes image stitching technique to stitch images captured by the image sensing units to acquire a panoramic image.

According to the claimed invention, an image capturing method with high image sensing coverage rate is applied to an image capturing device, and the image capturing device has an image sensing unit and an optical lens component overlapped with each other. The image capturing method shifting at least one of the image sensing unit and the optical lens component to make a central point of a sensing region of the image sensing unit not align with a central optical axle of an imagery circle of the optical lens component, and driving the image capturing device to acquire an image via the image sensing unit and the optical lens component.

The imagery circle of the optical lens component in the present invention can preferably align the edge with the longer lateral side, and further align the right-end and left-end edges to respectively with the right-end and left-end shorter lateral sides of the sensing region while the imagery circle is overlapped with the sensing region; however, the right-end edge or the left-end edge of the imagery circle may not align with the corresponding shorter lateral side of the sensing region. As long as the edge of the imagery circle can align with the longer lateral side of the sensing region distant from the fixing portion and an overlapped region between the imagery circle and the sensing region is greater than or equal to 180 degrees, the assembly of the image sensing unit and the optical lens component has the field of view over than 180 degrees and belongs to the design scope of the present invention. The present invention makes the image sensing unit overlapped with the optical lens component in a central dislocating manner, so the image sensing coverage rate of the image capturing device can be increased to simultaneously provide preferred image resolution about the monitoring region.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
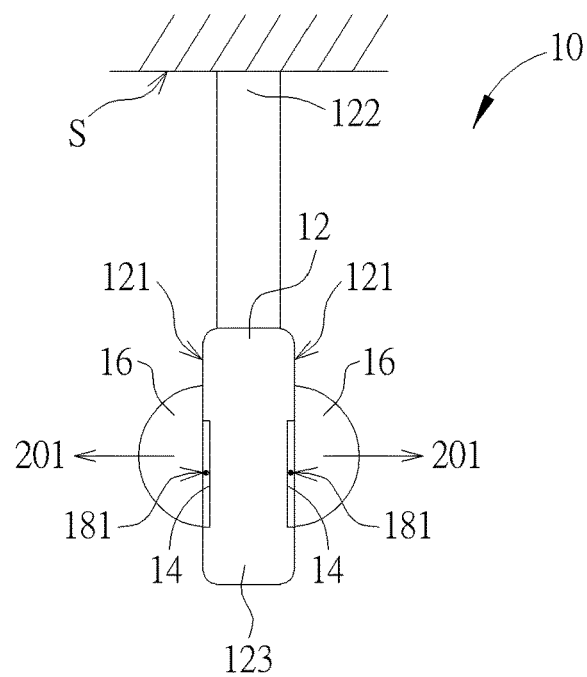
FIG. 1 is a lateral view of an image capturing device according to a first embodiment of the present invention.
Figure 2:
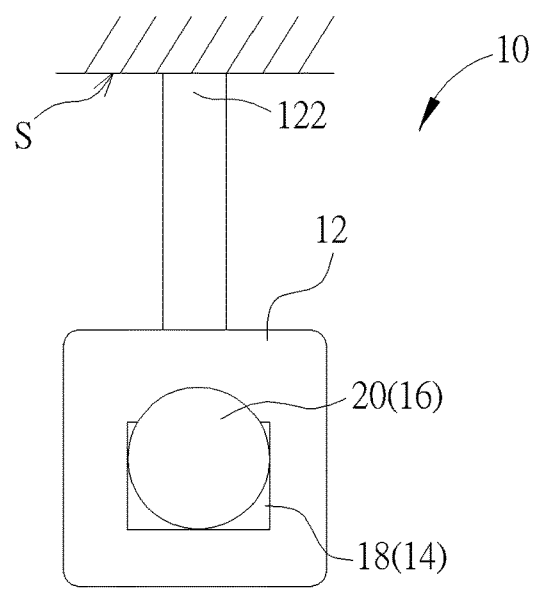
FIG. 2 is a front view of the image capturing device according to the first embodiment of the present invention.
Figure 3:
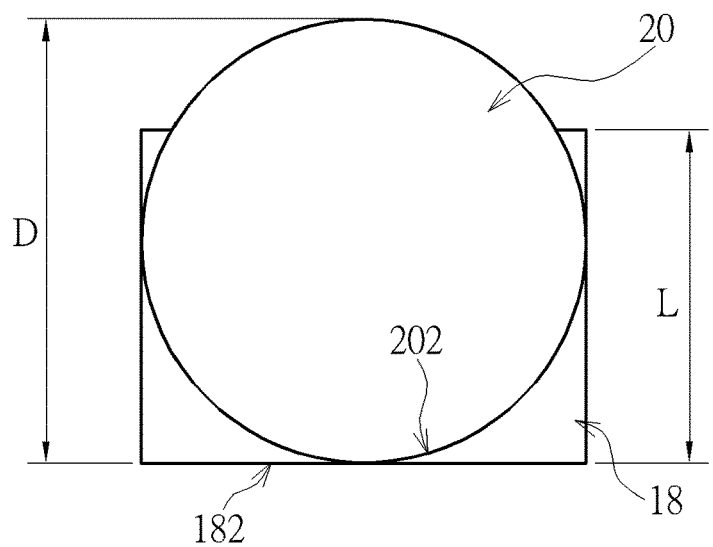
FIG. 3 is a diagram of a sensing region and an imagery circle overlapped with each other according to the first embodiment of the present invention.

Please refer to FIG. 1 to FIG. 3. FIG. 1 is a lateral view of an image capturing device 10 according to a first embodiment of the present invention. FIG. 2 is a front view of the image capturing device 10 according to the first embodiment of the present invention. FIG. 3 is a diagram of a sensing region 18 and an imagery circle 20 overlapped with each other according to the first embodiment of the present invention. The image capturing device 10 can include a base 12, an image sensing unit 14 and an optical lens component 16. The image sensing unit 14 has a sensing region 18 utilized for capturing an image. An amount of the image sensing unit 14 can be one or more, and the image sensing units 14 can be respectively disposed on corresponding lateral surfaces 121 on the base 12. The optical lens component 16 has an imagery circle 20, and an amount of the optical lens component 16 is equal to the amount of the image sensing unit 14. The optical lens component 16 can be disposed on the corresponding image sensing unit 14 in an overlapped manner, and a central optical axle 201 of each imagery circle 20 does not align with a central point 181 of the corresponding sensing region 18.

Generally, a length D of a diameter of the imagery circle 20 on the optical lens component 16 is greater than a length L of a lateral side (the shorter lateral side) of the sensing region 18 on the image sensing unit 14, the imagery circle 20 is partly overlapped with the sensing region 18, and a field of view formed by the imagery circle 20 and the sensing region 18 is preferably greater than or equal to 180 degrees. Therefore, the base 12 can be disposed on a working surface S via a fixing portion 122, and position of the optical lens component 16 is slightly close to the fixing portion 122 of the base 12, so that an edge 202 of the imagery circle 20 near to a free portion 123 can align with a lateral side 182 (the longer lateral side) of the sensing region 18 distant from the fixing portion 122, and the central optical axle 201 can be located between the central point 181 and the fixing portion 122. The image capturing device 10 can acquire an image via the overlapped region between the imagery circle 20 and the sensing region 18. Relation between the imagery circle 20 and the sensing region 18 of the present invention can maximize usage region of the image sensing unit 14 to increase an image sensing coverage rate for capturing more image information. Further, the length D of the diameter of the imagery circle 20 may be smaller than or equal to the length L of the lateral side of the sensing region 18, which depends on structural design.

Figure 4:
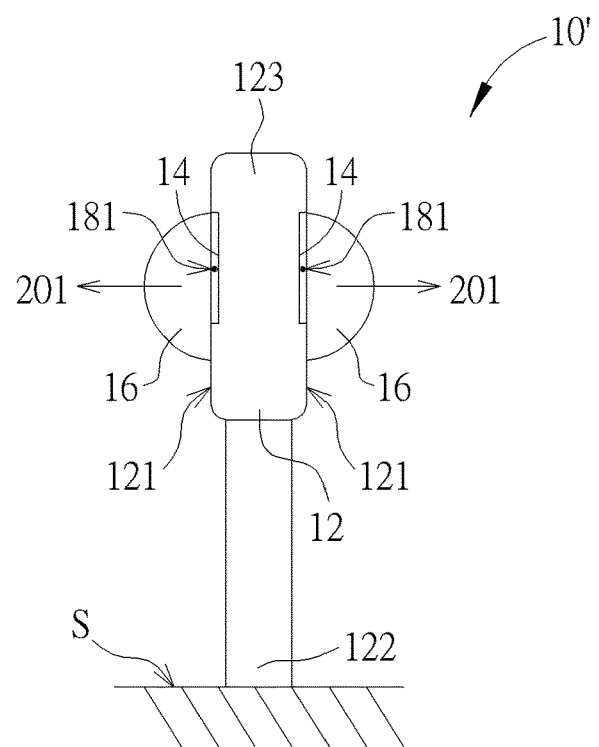
FIG. 4 is a lateral view of the image capturing device according to a second embodiment of the present invention.
Figure 5:
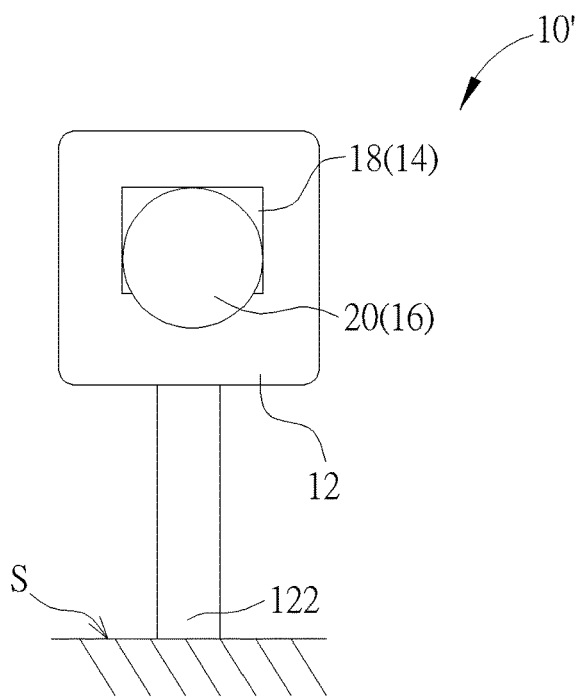
FIG. 5 is a front view of the image capturing device according to the second embodiment of the present invention.

Please refer to FIG. 4 and FIG. 5. FIG. 4 is a lateral view of an image capturing device 10' according to a second embodiment of the present invention. FIG. 5 is a front view of the image capturing device 10' according to the second embodiment of the present invention. The image capturing device 10 in the first embodiment is designed to install on the ceiling or the roof, the image capturing device 10' in the second embodiment is designed to install on the lower, which means the working surface S can be the ground or the tabletop, and an actual application of the image capturing device is not limited to above-mentioned embodiments. The image sensing unit 14 and the optical lens component 16 of the image capturing device 10' are not line up, for example the optical lens component 16 can be close to the working surface S, so that the central point 181 of the sensing region 18 does not align with the central optical axle 201 of the imagery circle 20, and the edge 202 of the imagery circle 20 close to the free portion 123 can align with the lateral side 182 (the longer lateral side) of the sensing region 18 distant from the fixing portion 122. While the image capturing devices 10 and 10' utilize two assemblies of the image sensing unit 14 and the optical lens component 16 to respectively acquire a plurality of images, the plurality of images can be stitched by image stitching technique to generate a panoramic image. Any image stitching technique capable of stitching images can be applied in the present invention for acquirement of the panoramic image, and a detailed description is omitted herein for simplicity.

Figure 6:
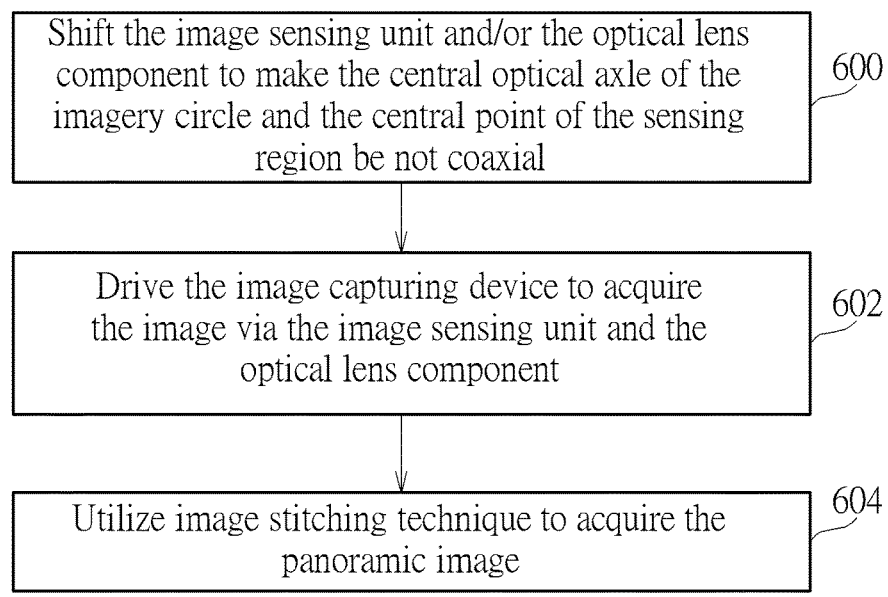
FIG. 6 is a flow chart of an image capturing method with high image sensing coverage rate according to an embodiment of the present invention.

Please refer to FIG. 6. FIG. 6 is a flow chart of an image capturing method with high image sensing coverage rate according to an embodiment of the present invention. The image capturing method illustrated in FIG. 6 is suitable for the image capturing devices 10 and 10' shown in FIG. 1 to FIG. 5. First, step 600 is executed to shift at least one of the image sensing unit 14 and the optical lens component 16 by a control unit (not shown in figures) of the image capturing device 10 or 10', to make the central optical axle 201 of the imagery circle 20 and the central point 181 of the sensing region 18 be not coaxial. Then, step 602 and step 604 are executed that the control unit drives the assembly of the image sensing unit 14 and the optical lens component 16 to acquire the image, and utilizes the image stitching technique to stitch the images captured by the image sensing units 14 for generating the panoramic image.

In step 600, the control unit can drive the image sensing unit 14 to move relative to the optical lens component 16, or drive the optical lens component 16 to move relative to the image sensing unit 14, or drive the image sensing unit 14 and the optical lens component 16 to respectively move in opposite directions, so as to execute non-coaxial offset match. In addition, at least one of the image sensing unit 14 and the optical lens component 16 can be manually shifted by the user, which is aimed for moving the central optical axle 201 of the imagery circle 20 to be located between the fixing portion 122 and the central point 181 of the sensing region 18, and for aligning the edge 202 of the imagery circle 20 with the lateral side 182 (the longer lateral side) of the sensing region 18 distant from the fixing portion 122. Thus, the image sensing coverage rate of the image capturing devices 10 and 10' can be increased effectively, and step 602 and step 604 can be executed to capture the images and stitch the said images for generation of the panoramic image.

As shown in FIG. 3, the imagery circle 20 can preferably align the edge 202 with the lateral side 182 (the longer lateral side), and further align the right-end and left-end edges respectively with the right-end and left-end lateral sides (the shorter lateral side) of the sensing region 18 while the imagery circle 20 is overlapped with the sensing region 18; however, the right-end edge or the left-end edge of the imagery circle 20 may not align with the corresponding shorter lateral side of the sensing region 18. As long as the edge 202 of the imagery circle 20 can align with the lateral side 182 (the longer lateral side) of the sensing region 18 distant from the fixing portion 122 and an overlapped region between the imagery circle 20 and the sensing region 18 is greater than or equal to 180 degrees, the assembly of the image sensing unit 14 and the optical lens component 16 has the field of view over than 180 degrees and belongs to the design scope of the present invention.

Comparing to the prior art, the present invention makes the image sensing unit overlapped with the optical lens component in a central dislocating manner, the working surface whereon the image capturing device is disposed may be the ceiling or the ground in actual application, and image information about the ceiling and the ground is unimportant (which is not the major monitoring region focused by the user), so that arrangement of the optical lens component and the image sensing unit can be shifted or deviated adjustably to conform to actual demand. As coverage region of the optical lens component is larger than dimensions of the image sensing unit, the image sensing coverage rate of the image capturing device can be increased to simultaneously provide preferred image resolution about the monitoring region.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing device with high image sensing coverage rate, the image capturing device comprising:
   a base;
   an image sensing unit disposed on a lateral surface of the base and having a sensing region; and
   an optical lens component overlapped with the image sensing unit and having an imagery circle, a central optical axle of the imagery circle not aligning with a central point of the sensing region;
   wherein the image capturing device captures an image via the optical lens component and the imaging sensing unit;
   wherein the image capturing device further comprises another image sensing unit and another optical lens component disposed on another lateral surface of the base in an overlapped manner, and a central optical axle of an imagery circle of the another optical lens component does not align with a central point of a sensing region of the another image sensing unit.

2. The image capturing device of claim 1, wherein a field of view (FOV) formed by the sensing region and the imagery circle overlapped with each other is greater than or equal to 180 degrees.

3. The image capturing device of claim 1, wherein a diameter of the imagery circle is longer than a lateral side of the sensing region.

4. The image capturing device of claim 1, wherein the base is disposed on a working surface via a fixing portion, and the central optical axle is located between the central point and the fixing portion.

5. The image capturing device of claim 4, wherein an edge of the imagery circle aligns with a lateral side of the sensing region distant from the fixing portion.

6. The image capturing device of claim 1, wherein the image capturing device further utilizes image stitching technique to stitch images captured by the image sensing units to acquire a panoramic image.

7. An image capturing method with high image sensing coverage rate applied to an image capturing device, the image capturing device having a base, an image sensing unit and an optical lens component overlapped with each other, the image sensing unit and the optical lens component being disposed on the same lateral surface of the base, the image capturing method comprising:
   determining an orientation of a fixing portion of the base;
   shifting at least one of the image sensing unit and the optical lens component to move a central optical axle of an imagery circle of the optical lens component to a position located between a central point of a sensing region of the image sensing unit and the fixing portion, so as to make the central point not align with the central optical axle; and
   driving the image capturing device to acquire an image via the image sensing unit and the optical lens component.

8. The image capturing method of claim 7, wherein the image capturing device further has another image sensing unit and another optical lens component disposed on another lateral surface of the base in an overlapped manner, the image capturing method further comprises:
   utilizing image stitching technique to stitch images captured by the image sensing units to acquire a panoramic image.

9. The image capturing method of claim 7, wherein a diameter of the imagery circle is longer than a lateral side of the sensing region.

10. The image capturing method of claim 7, wherein the image capturing method further comprises:
    aligning an edge of the imagery circle with a lateral side of the sensing region distant from the fixing portion.

11. An image capturing method with high image sensing coverage rate applied to an image capturing device, the image capturing device having a base, an image sensing unit and an optical lens component overlapped with each other, the image sensing unit and the optical lens component being disposed on the same lateral surface of the base, the image capturing method comprising:
    disposing the base on a working surface via a fixing portion of the base to make a central optical axle of an imagery circle of the optical lens component be located between a central point of a sensing region of the image sensing unit and the fixing portion;
    shifting at least one of the image sensing unit and the optical lens component, to make the central point not align with the central optical axle; and
    driving the image capturing device to acquire an image via the image sensing unit and the optical lens component.

12. The image capturing method of claim 11, wherein the image capturing method further comprises:
    determining an orientation of the fixing portion; and
    shifting at least one of the image sensing unit and the optical lens component to move the central optical axle to a position located between the central point and the fixing portion.

13. The image capturing method of claim 12, wherein the image capturing device further has another image sensing unit and another optical lens component disposed on another lateral surface of the base in an overlapped manner, the image capturing method further comprises:
    utilizing image stitching technique to stitch images captured by the image sensing units to acquire a panoramic image.

14. The image capturing method of claim 12, wherein a diameter of the imagery circle is longer than a lateral side of the sensing region.

15. The image capturing method of claim 11, wherein the image capturing method further comprises:
    aligning an edge of the imagery circle with a lateral side of the sensing region distant from the fixing portion.

* * * * *